June 30, 1925.
E. BOARD
1,543,902
BEARING FOR ROTORS OF RADIO APPARATUS
Filed July 9, 1923
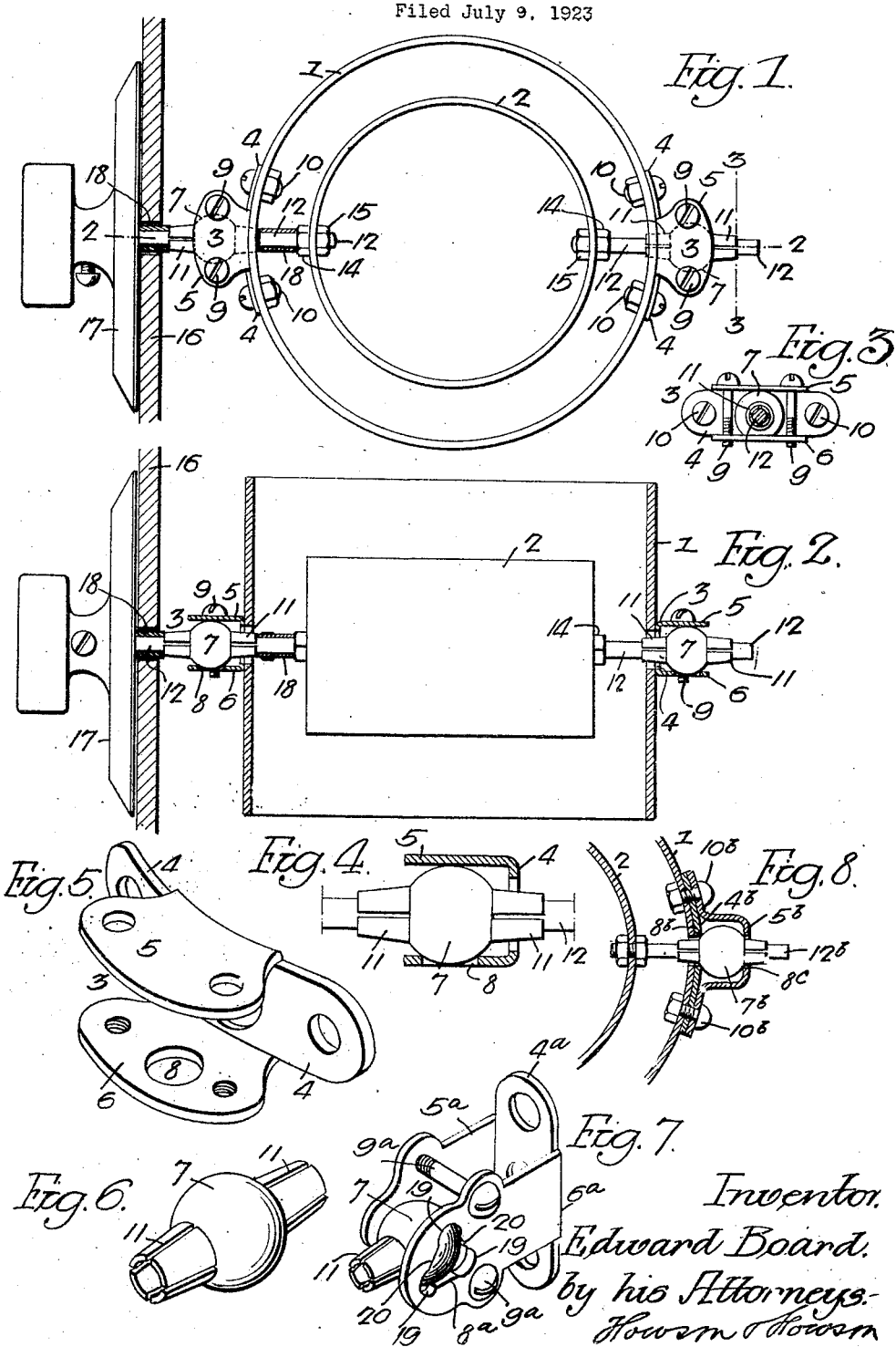

Patented June 30, 1925.

1,543,902

UNITED STATES PATENT OFFICE.

EDWARD BOARD, OF PHILADELPHIA, PENNSYLVANIA.

BEARING FOR ROTORS OF RADIO APPARATUS.

Application filed July 9, 1923. Serial No. 650,253.

*To all whom it may concern:*

Be it known that I, EDWARD BOARD, a citizen of the United States, residing in Philadelphia, Pennsylvania, have invented certain Improvements in Bearings for Rotors of Radio Apparatus, of which the following is a specification.

The object of my invention is to improve the construction of the bearings that support the rotors of the vario-coupler and variometer and like parts of radio apparatus, so that the rotor can be adjusted accurately in respect to the stator and one bearing can be brought into alignment with the other bearing.

In the accompanying drawings:

Fig. 1 is a plan view of sufficient of a vario-coupler of a radio apparatus to illustrate my invention;

Fig. 2 is a sectional view on the line 2—2, Fig. 1;

Fig. 3 is a sectional view on the line 3—3, Fig. 1;

Fig. 4 is an enlarged view of one of the bearings illustrated in Fig. 2;

Fig. 5 is a perspective view of one of the bearings, the ball being removed;

Fig. 6 is a perspective view of the ball of the bearing; and

Figs. 7 and 8 are views illustrating modifications of the bearing.

Referring to the drawings 1 is the stator of a vario-coupler, the wire being omitted. 2 is the rotor located within the stator, the wire being omitted. Secured to the outer walls of the stator are bearings 3, one bearing being located opposite the other, as shown in Fig. 1. Each bearing 3 consists of a curved base plate 4 having an upper bearing plate 5 and a lower bearing plate 6, bent from the base plate 4, as shown in Fig. 5. The upper plate 5 is not perforated and has a smooth bearing surface for a ball 7, Fig. 6. The lower plate 6 has a round hole 8 therein for the reception of a portion of the ball 7, as shown in Fig. 4.

This construction makes a substantial and correct support for the ball and provides an annular bearing at one side and a point bearing at the opposite side. The two bearing plates 5 and 6 can be adjusted in respect to the ball by set screws 9, which pass through holes in the plate 5 and are screwed into threaded openings in the plate 6, Fig. 5. The base plate 4 is secured to the stator by screw bolts 10, or other suitable fastenings.

The balls are made as shown in Fig. 6. Each ball has an extension 11 at each side. The ball and the extensions are preforated, as shown, for the passage of a spindle 12. The extensions are split, as shown, and form gripping arms that hold the spindles frictionally. These spindles are attached at opposite sides to the rotor 2, as clearly shown in Fig. 1. In the present instance, each spindle is threaded for the reception of nuts 14 and 15 so that the rotor can be held securely on the two spindles. One of the spindles 12 passes through a panel 16 of the usual type. On this spindle is a dial 17 by which the rotor is turned. After the parts have been adjusted and the rotor has been adjusted centrally in respect to the stator, a sleeve 18 may be located on one of the spindles between the rotor and the stator, as clearly shown in Fig. 1. As the two spindles must be connected independently to the rotor, it is difficult to bring them in alignment with the ordinary bearing. With my improved bearing hereinbefore described, the balls adjust themselves in their bearings and the spindles can be moved longitudinally until the rotor is located properly. The ball of each bearing is held in an opening on one bearing plate by the pressure of the other bearing plate and makes a firm support for the ball.

In Fig. 7, a modification is illustrated, in which the opening $8^a$ is cut away at three points 19, forming three bearing surfaces 20, which makes what may be termed a three-point bearing for the ball. In this instance, the bearing plates $5^a$ and $6^a$ are side bearing plates and are adjusted by screws $9^a$.

In Fig. 8, another modification is shown, in which the ball $7^b$ is located between a base plate $4^b$ and a bearing plate $5^b$ secured to the base plate by bolts $10^b$ by which the bearings is attached to the stator. In the base plate $4^b$ is an enlarged opening $8^b$ and in the bearing plate $5^b$ is an enlarged opening $8^c$. The extensions of the ball $7^b$ project through these openings and frictionally hold the spindle $12^b$. The ball bears against the edges of the openings and is allowed a certain amount of movement so that the two spindles can accommodate themselves to their bearings.

I claim:

1. The combination in a bearing, of a base having two integral bearing plates at right angles to the base, one of said bearing plates having a perforation; a ball mounted between the plates and resting in the perforation; a spindle extending through the ball; and means for adjusting the plates, one in respect to the other to place more or less friction on the ball.

2. The combination in a bearing, of a sheet metal base having integral bearing plates at right angles to the base, one of said plates having a socket; a ball mounted between the plates and resting in the socket, said ball having split extensions; a spindle mounted in the ball and extensions and frictionally held by said split extensions; and screws engaging the plates for placing more or less friction on the ball.

3. The combination in a bearing, of a perforated ball having split extensions; a spindle mounted in the perforation of the ball and clamped by the extensions; two bearing plates between which the ball is located; and means for drawing the plates together and onto the ball to place more or less friction on the ball.

4. The combination in a bearing, of a base having two integral bearing plates spaced apart, one of said bearing plates having an opening with three bearing points; a ball mounted between the two plates and resting against the three bearing points at the opening in one of said plates; and a spindle extending through the ball.

5. The combination in a bearing, of a sheet metal base having two integral bearing plates bent therefrom, one of said plates having a socket, each bearing plate having openings therein; clamping screws mounted in the walls of the openings to draw the plates towards each other; a ball mounted between the plates and resting in the socket in one of the plates; a spindle extending through the ball; and means for frictionally holding the spindle in the ball.

EDWARD BOARD.